US007794677B2

(12) United States Patent
Jara et al.

(10) Patent No.: US 7,794,677 B2

(45) Date of Patent: Sep. 14, 2010

(54) REDUCTION OF COPPER CONTENT IN THE MOLYBDENITE CONCENTRATE

(75) Inventors: Javier Jara, Dollard des Ormeux (CA); Sylvester Zuttah, Montreal (CA)

(73) Assignee: Air Liquide Canada, Inc., Montreal, Quebec ( * ) Notice: Subject to any disclaimer, the term of this patent is extended or adjusted under 35 U.S.C. 154(b) by 0 days.

(21) Appl. No.: 12/643,541

(22) Filed: Dec. 21, 2009

(65) Prior Publication Data

US 2010/0098605 A1 Apr. 22, 2010

Related U.S. Application Data

(63) Continuation of application No. 11/331,406, filed on Jan. 12, 2006.

(60) Provisional application No. 60/649,463, filed on Feb. 2, 2005.

(51) Int. Cl.

| | |
|---|---|
| ***C22B 15/00*** | (2006.01) |
| ***C22B 11/00*** | (2006.01) |
| ***C22B 60/02*** | (2006.01) |
| ***C21B 15/00*** | (2006.01) |
| ***C01G 39/00*** | (2006.01) |
| ***C01G 41/00*** | (2006.01) |
| ***C01G 37/00*** | (2006.01) |
| ***C01G 3/00*** | (2006.01) |
| ***C01G 5/00*** | (2006.01) |
| ***C01G 56/00*** | (2006.01) |
| ***C01G 49/02*** | (2006.01) |
| ***C01B 31/16*** | (2006.01) |
| ***B01D 11/00*** | (2006.01) |
| ***B01D 53/56*** | (2006.01) |
| ***B01F 1/00*** | (2006.01) |

(52) U.S. Cl. ............................ 423/53; 423/56; 423/55; 423/23; 423/24; 423/27; 423/34; 423/3; 423/18; 423/633; 423/20; 423/41; 423/219; 423/38; 423/39; 75/740; 75/721; 75/744; 252/184

(58) Field of Classification Search ...................... None
See application file for complete search history.

(56) References Cited

U.S. PATENT DOCUMENTS

| | | | |
|---|---|---|---|
| 3,252,787 | A | 5/1966 | Shiah |
| 3,674,424 | A | 7/1972 | Stanley et al. |

(Continued)

FOREIGN PATENT DOCUMENTS

| | | |
|---|---|---|
| CA | 959654 | 12/1974 |
| DE | 19755350 | 6/1999 |
| GB | 153792 | 11/1920 |
| GB | 1488260 | 10/1977 |
| JP | 04104912 | 4/1992 |
| JP | 05195106 | 8/1993 |

OTHER PUBLICATIONS

Ukasik, et al., "Leaching Of Chalcopyrite with Acidified Ferric Chloride and Ozone Presence," Acta Mettallurgica Slovaca, 4, Special Issue Apr. 2001, pp. 193-197, XP002254349, ISSN: 1335-1532, last paragraph of p. 193; end of p. 195.

PCT International Search Report, Aug. 17, 2006 and Written Opinion.

(Continued)

*Primary Examiner*—Melvin C Mayes
*Assistant Examiner*—Guinever S Gregorio
(74) *Attorney, Agent, or Firm*—Donna Blalock Holguin

(57) ABSTRACT

Methods and systems for removing copper minerals from a molybdenite concentrate. One embodiment provides leaching copper from the molybdenite concentrate with a leaching solution comprising ferric chloride, removing molybdenite from the leaching solution, introducing an acid into the leaching solution and introducing $O_2$, $O_3$, or a combination of both, into the leaching solution. A method for regenerating ferric chloride in a leaching solution is also provided. One embodiment provides adding a leaching solution comprising Fe(II) ions, Fe(III) ions, or a combination of both, to a mixture of mineral sulfides, introducing an acid into the leaching solution, and introducing $O_2$, $O_3$, or a combination of both, into the leaching solution.

9 Claims, 2 Drawing Sheets

H2O
280
PREHEATER
170
IRON ION REMOVAL
OPTIONAL
IRON SOLUTION
190
215
VENT GAS
STEAM
120
STORAGE TANK
210
AUTOCLAVE
220
FLASH VESSEL
150
FILTER
FILTRATE
160
DECOPPERIZATION
205
MOLYBDENITE CONCENTRATE
130
02
140
HCl
SLURRY DISCHARGE
MOLYBDENITE
FE
CU

U.S. PATENT DOCUMENTS

| | | | | |
|---|---|---|---|---|
| 3,714,325 | A | 1/1973 | Bloom et al. | |
| 3,798,026 | A | 3/1974 | Milner et al. | |
| 4,083,921 | A * | 4/1978 | Wesely | 423/55 |
| 4,097,271 | A | 6/1978 | Swinkels et al. | |
| 4,236,918 | A * | 12/1980 | Narain | 75/429 |
| 5,874,055 | A * | 2/1999 | Jones | 423/24 |
| 6,149,883 | A * | 11/2000 | Ketcham et al. | 423/54 |
| 6,159,435 | A * | 12/2000 | Nguyen | 423/3 |
| 7,169,371 | B2 * | 1/2007 | Jones | 423/24 |

OTHER PUBLICATIONS

Hydromettallurgy 2003, Proceedings of the 5th International Symposium Honoring Professor Ian M. Ritchie, "Chloride Processing of Metal Sulphides: review of Fundamentals and Applications", G. Senanayake and D.M. Muir, p. 517 and 528.

K.G. Baxter et al.: Testing And Modeling A Novel Iron Control Concept In A Two-Stage Ferric Leach/Pressure Oxidation Process for the Sepon Copper Project' In Pressure Hydrometallurgy 2004, 34th Annual Hydrometallurgy Meeting 2004, p. 57-76.

Y.Awakura et al.: "Oxidation of Fe(II) in HCI and H2SO4 Solutions With Dissolved Molecular Oxygen in the Presence and Absence of a Cupric Catalyst" in Organization of the International Symposium on Iron Control Hydrometallurgy, Oct. 19-22, 1986, pp. 202-223.

P.H. Jennings et al., "Development of A Process for Purifying Molybdenite Concentrates" Presentation at the 1975 A.I.M.E. Meeting International Symposium on Hydrometallurgy, Chicago, IL, Feb. 25 through Mar. 1, 1975.

Opposition filed in Chile of Patent Application No. 213-2006 dated Jun. 30, 2006 - Translated.

* cited by examiner

REDUCTION OF COPPER CONTENT IN THE MOLYBDENITE CONCENTRATE

CROSS-REFERENCE TO RELATED APPLICATIONS

This application is a Continuation of U.S. Non-Provisional application Ser. No. 11/331,406, filed Jan. 12, 2006, entitled "Reduction Of Copper Content In The Molybdenite Concentrate" which claims benefit of U.S. Provisional Patent Application Ser. No. 60/649,463, filed Feb. 2, 2005, entitled "Reduction of Copper Content in the Molybdenite Concentrate" which is herein incorporated by reference.

BACKGROUND

1. Field of the Invention

Embodiments of the present invention generally relate to a method for mineral purification and more particularly to a method of removing metal sulfides from a molybdenite concentrate.

2. Description of the Related Art

Copper ore deposits containing copper sulfide minerals, such as chalcopyrite ($CuFeS_2$), chalcocite ($Cu_2S$), and bornite ($Cu_5FeS_4$) may contain minor amounts of molybdenite ($MoS_2$). Recovery of the valuable molybdenite locked up in the ore is usually performed by a milling operation, followed by several flotation steps. The final molybdenite concentrate usually contains some sulfide minerals, and, to be commercial, the copper sulfide mineral content is typically reduced through a leaching step in which the copper sulfide minerals are dissolved by a leaching solution.

The leaching step is typically performed in a batch operation where the molybdenite concentrate is exposed to the leaching solution in a leaching vessel. After the leaching process, the leaching solution is separated from the molybdenite and is regenerated using chlorine gas. Due to the hazardous nature of the chlorine gas a batch operation with several safety procedures is required during the regenerating process, resulting in high labor, handling, and safety costs.

Accordingly, given the high costs associated with using chlorine gas, the batch operation using chlorine gas is suited to produce small amounts of material. For large amounts of products a continuous mode is normally more economical. In a continuous mode operation, leaching can be performed uninterrupted because the leaching solution is replenished as it is being used. Thus, in a continuous mode operation more molybdenite concentrate can be leached in the same amount of time it takes for leaching in a batch mode operation.

Therefore, a need exists for a method of regenerating a leaching solution for use in a leaching process that is more cost efficient, safer, and can be utilized in a continuous process as well as in a batch process.

SUMMARY

The embodiments of the present invention generally provide a method for removing copper minerals from a molybdenite concentrate. One embodiment of the invention provides a method for removing copper sulfides from a molybdenite concentrate by leaching the copper sulfides from the molybdenite concentrate with a leaching solution comprising ferric chloride, removing molybdenite from the leaching solution, introducing an acid into the leaching solution and introducing $O_2$, $O_3$, or a combination of both, into the leaching solution.

Another embodiment of the invention provides for obtaining commercial grade molybdenite from a copper ore. The method includes separating a molybdenite concentrate from the copper ore, leaching copper from the molybdenite concentrate with a leaching solution comprising ferric chloride, removing molybdenite from the leaching solution, introducing an acid into the leaching solution and introducing $O_2$, $O_3$, or a combination of both, into the leaching solution.

Further embodiments of the invention provide a method for removing copper minerals from a molybdenite concentrate. An exemplary method includes pumping molybdenite concentrate into an autoclave vessel, introducing a solution of Fe(II) ions, Fe(III) ions, or a combination of both, into the autoclave vessel, introducing an acid into the autoclave vessel, introducing $O_2$, $O_3$, or a combination of both, into the autoclave vessel, and filtering the molybdenite from a stream exiting the autoclave vessel.

In another embodiment, the invention further provides a method for regenerating ferric chloride in a leaching solution. An exemplary method includes adding a leaching solution comprising Fe(II) ions, Fe(III) ions, or a combination of both, to a mixture of mineral sulfides, and introducing an acid and $O_2$, $O_3$, or a combination of both, into the leaching solution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENTS

Figure 1:
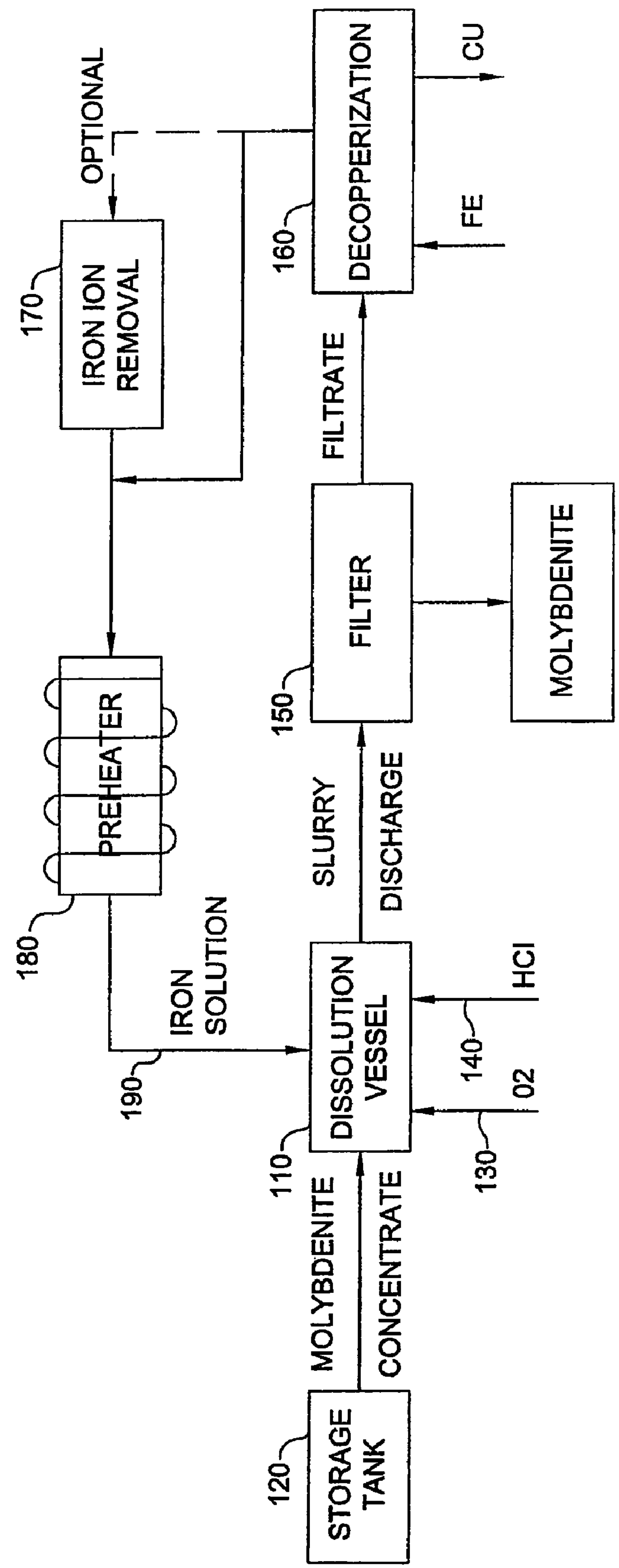
FIG. 1 is a block diagram for the process of reducing copper content in a molybdenite concentrate at atmospheric pressure.

FIG. 1 is a block diagram of a system 100 for carrying out a first process, according to one embodiment of the invention. The system 100 includes introducing a molybdenite concentrate into a dissolution vessel 110. The molybdenite concentrate may be stored in a storage tank 120, and typically includes 3-4% w/w copper sulfide minerals, such as, chalcopyrite, chalcocite, bornite, etc. The dissolution vessel 110 is made from a material which will not 35dissolve or etch in the conditions used during the dissolution process. In one embodiment, the material is glass. A solution of hydrochloric acid is introduced into the dissolution vessel through inlet 140. The concentration of hydrochloric acid is kept between about 0.7 M and about 4.0 M, and more preferably at about 4.0 M, throughout the dissolution process. A stream comprising ferrous chloride, ferric chloride, or a combination of the two, is introduced to the dissolution vessel through inlet 190. Oxygen, ozone, or a combination of the two, is introduced through inlet 130 into the slurry of the dissolution vessel so that gas bubbles are formed in the slurry and solution. The dissolution vessel is kept at temperatures above about 90° C., and more preferably between about 100° C. and about 120° C. The slurry is agitated by stirring methods, such as mechanical agitators which may include a motor, a shaft and an impeller.

Depending on the operating parameters and the mineralogical copper species, the leach process is completed after about 10 minutes to about 120 minutes. A stream of the slurry, which has been leached, is then filtered at filter 150 and the filter cake is rinsed with hot water. The water used to rinse the slurry is heated to between about 60° C. and about 100° C., and preferably to about 60° C. The water used for rinsing may also be acidic. The solid separated from the filtrate is dried to a moisture content of less than about 5% w/w and contains molybdenite with a copper content of less than about 0.2% w/w. The filtrate comprising ferrous chloride, ferric chloride, or a combination of both, acid, and dissolved cupric chloride then go through a copper removal process 160 where the copper ions are precipitated as elemental copper out of solution by using iron scrap as a reductant, as shown in Equation 1:

$$Fe+2Cu^{2+}=Fe^{2+}+Cu \qquad \text{Equation 1.}$$

After decopperization, the filtrate contains a higher concentration of iron ions than may be desirable, and thus the filtrate may then go through an optional iron removal process 170 to keep the iron ion concentration around 100 g/L. One way to remove excess iron ions is by reducing the temperature of the filtrate which will decrease the solubility of the iron ions causing precipitation of excess iron chlorides. The filtrate is then heated in preheater 180, and reintroduced into the dissolution vessel 110 through inlet 190.

FIG. 1 describes the continuous process at atmospheric pressure. An alternative embodiment of FIG. 1 is a batch process. In a batch process oxygen, ozone, or a combination of the two, and hydrochloric acid are added to a predetermined volume of acid solution containing ferrous chloride, ferric chloride, or a combination of the two, in dissolution vessel 110. When the ferric chloride concentration reaches a desired level (between about 20 g/L and 100 g/L) molybdenite concentrate is added to vessel 110. During dissolution of copper, only hydrochloric acid is added to vessel 110 in order to maintain an acidity between 1 to 4 M, while ferric chloride concentration decreases with time due to production of ferrous chloride.

In yet an alternative embodiment of FIG. 1, the $O_2/O_3$ and hydrochloric acid are added to the stream of ferrous chloride, ferric chloride, or a combination of the two, prior to entering the dissolution vessel 110.

Figure 2:
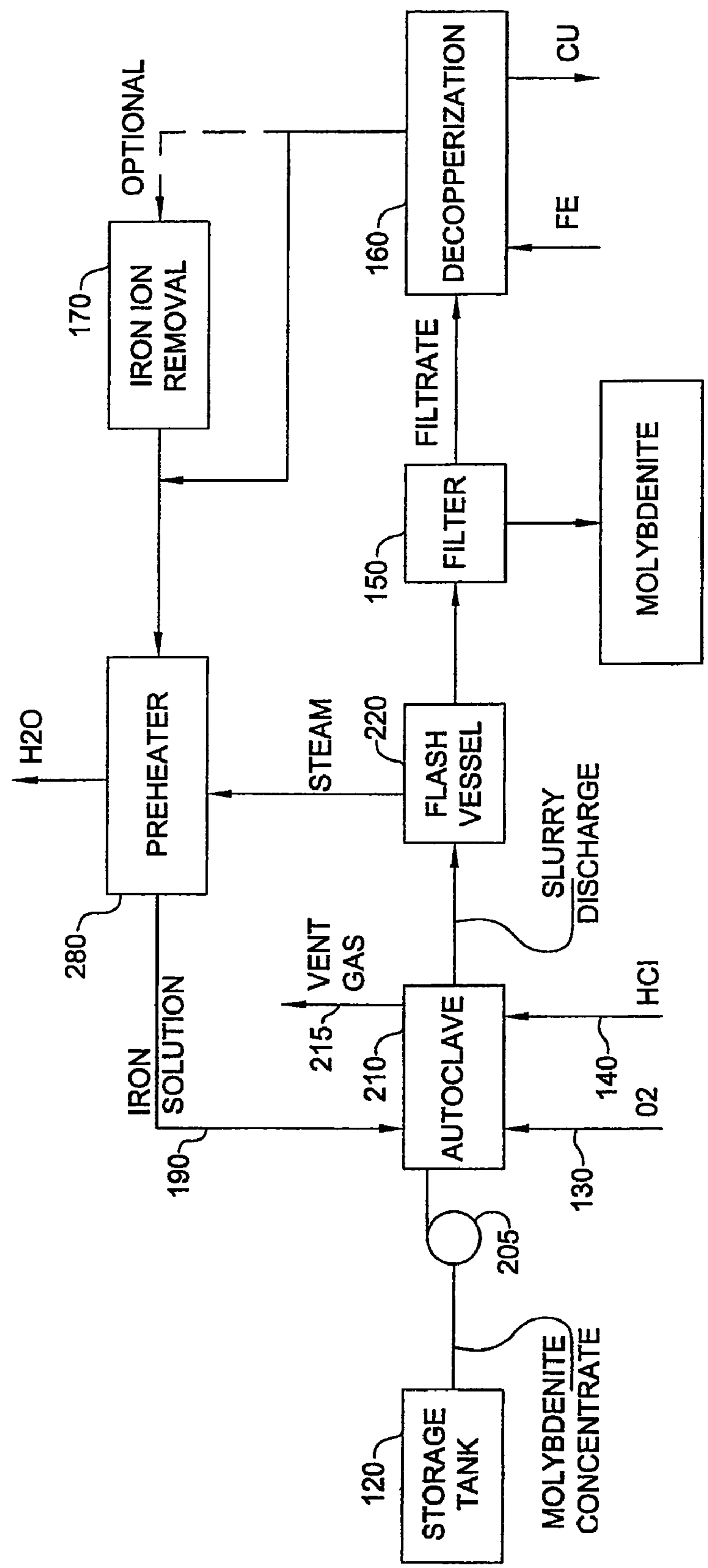
FIG. 2 is a block diagram for the process of reducing copper content in a molybdenite concentrate under pressure.

FIG. 2 is a block diagram of a system 200 for carrying out a second process at pressures higher than atmospheric pressure, according to another embodiment of the invention. System 200 includes many of the same steps as system 100, and identical elements are numbered as they are in FIG. 1. Molybdenite concentrate in the form of an aqueous slurry is introduced from the storage tank 120 through a high pressure pump 205 into an autoclave 210. Oxygen, ozone, or a combination of the two, hydrochloric acid, and a solution of ferrous chloride, ferric chloride, or a combination of the two, are introduced into the autoclave 210 through inlets 130, 140, and 190, respectively, as in system 100. The conditions in autoclave 210 are similar to the conditions of dissolution vessel 110 of system 100. However, in system 200, oxygen, ozone, or a combination of the two, is introduced into autoclave 210 to elevate the pressure in the autoclave. The internal pressure of the autoclave is elevated to about 7 bar gauge compared to atmospheric pressure; however, other pressures are also contemplated, such as 20 to 30 bar. Additionally, autoclave 210 has an outlet 215 for the controlled removal of excess gas. A stream of the slurry which has been leached is then discharged into flash vessel 220 where the pressure of the slurry is reduced to atmospheric pressure, and part of the water evaporates as steam. The steam may be used to heat pre heater 280. The slurry and solution, at atmospheric pressure and about 50° C., are then filtered by filter 150. The solid separated from the solution is dried to a moisture content of less than about 5% w/w and contains molybdenite with a copper content of less than about 0.2% w/w. The filtrate comprising ferrous chloride, ferric chloride, or a combination of both, acid, and cupric chloride then go through a copper removal process 160 where copper is precipitated out of solution. The decopperized solution may then go through the optional iron removal process 170 before the solution is heated in pre heater 280. The filtration is then reintroduced into the autoclave vessel 210 through inlet 190.

An alternative embodiment of the process of FIG. 2 is a batch process wherein oxygen, ozone, or a combination of the two, and hydrochloric acid are added to a predetermined volume of acid solution containing ferrous chloride, ferric chloride, or a combination of the two, in autoclave 210. When the ferric chloride concentration reaches a desired level (between about 20 g/L and 100 g/L) molybdenite concentrate is added to autoclave 210. During dissolution of copper, only hydrochloric acid is added to autoclave 210 in order to maintain an acidity between 1 to 4 M, while ferric chloride concentration decreases with time due to production of ferrous chloride.

In yet an alternative embodiment of FIG. 2, the $O_2/O_3$ and acid are added to the stream of ferrous chloride, ferric chloride, or a combination of the two, prior to entering the autoclave 210.

The first and second processes carried out in the systems 100 and 200, respectively, take advantage of the fact that Fe(III) in a solution of ferric chloride ($FeCl_3$) will dissolve copper containing sulfide minerals, such as chalcopyrite and bornite. The following equations show the copper dissolution of chalcopyrite (Equation 2) and bornite (Equation 3) in the presence of ferric chloride:

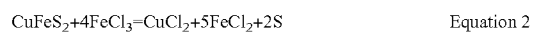

$$CuFeS_2+4FeCl_3=CuCl_2+5FeCl_2+2S \qquad \text{Equation 2}$$

$$Cu_5FeS_4+12FeCl_3=5CuCl_2+13FeCl_2+4S \qquad \text{Equation 3}$$

From the equations above it is seen that when ferric chloride reacts with the iron/copper sulfides, the Fe(III) of ferric chloride is reduced to Fe(II) (ferrous chloride). Ferrous chloride is not a strong enough oxidizer to dissolve the copper containing sulfide minerals, and regeneration of ferric chloride from ferrous chloride must take place for there to be any further leaching of the copper containing sulfide minerals.

By providing acid and an oxygen-containing gas, such as oxygen and/or ozone, to the iron chloride solution, ferrous chloride is oxidized to ferric chloride which can again be used to leach copper containing sulfides from the molybdenite concentrate. The oxidation of $Fe^{2+}$ can be described by the following equations:

$$4Fe^{2+}+O_2+4H^+=4Fe^{3+}+2H_2O \qquad \text{Equation 4}$$

$$2Fe^{2+}+O_3+2H^+=2Fe^{3+}+H_2O_2 \qquad \text{Equation 5}$$

However, due to the high concentration of HCl and iron ions, significant changes in free acid, iron complexes and water activity make it difficult to follow the stoichiometry of the reactions. Thus, Equations 4 and 5 above represent an example of the stoichiometry that might occur, and not every stoichiometric possibility of the high acid concentration reactions.

Iron Ion Oxidation Employing Oxygen and/or Oxygen

The effectiveness of using oxygen or ozone with hydrochloric acid to oxidize ferrous chloride to ferric chloride is tested in several experiments in solutions of ferrous chloride (100 g/L), copper (0 to 10 g/L), and hydrochloric acid (0.7 to 4 M). As this test is for the determination of the feasibility of oxidizing ferrous chloride to ferric chloride, this experiment is performed in the absence of molybdenite concentrate. Oxygen or ozone is introduced into the solution through a glass fritted bubbler, and the oxidation rate is obtained at one hour during which time the unit gas consumption is measured. Table 1 shows the effect of the level of agitation and oxygen gas flow on the rate of iron oxidation and the corresponding consumption of gas.

TABLE 1

Effect of oxygen flow and level of agitation at atmospheric pressure and 4 M HCl.

| Test | Oxygen Flow L/min | Temperature ° C. | Agitation | Oxidation Rate g $Fe^{3+}$/L/h | Consumption g $O_2$/g Fe |
|---|---|---|---|---|---|
| 15 | 0.2 | 72 | 600 rpm | 28 | 0.65 |
| 16 | 0.4 | 72 | 600 rpm | 39 | 0.84 |
| 6 | 1.0 | 82 | Magnetic | 69 | 3.34 |

Agitation is provided by either a mechanical agitator which includes a motor, a shaft and an impeller providing agitation at 600 rmp, or a magnetic stirrer which creates a lower level of agitation than the mechanical agitator. It can be seen that upon increase in oxygen flow, the oxidation rate also increases, even if the level of agitation is significantly reduced as when agitation is performed by a magnetic stirrer. The oxidation rates in the range of 28 to 69 g/L/h observed using oxygen and hydrochloric acid are significantly higher than the oxidation rates obtained using chlorine gas which are typically about 15 g/L/h.

The oxidation rate of Fe(II) to Fe(III) is increased when the oxygen pressure in the reaction vessel is increased. The effect of oxygen pressure on the oxidation rate is presented in Table 2. For the high pressure reaction, an oxygen pressure regulator is fixed to maintain an oxygen pressure of about 7 bar. The reaction vessel has a small opening at the exit valve in order to release excess pressure. Attached to the exit valve is a wet meter which measures the exhaust gas flow as the gas exits the reaction vessel. The exhaust gas flow measured is not uniform, indicating that the oxygen is introduced to the reaction vessel in pulses. In Table 2, it can be seen that the oxidation rate increases three to four times when the operating pressure is 7 bar gauge compared to atmospheric pressure, while the gas consumption is three to four times lower.

TABLE 2

Effect of pressure on oxidation rates and oxygen consumption

| Test | Pressure Gauge Bar | Oxygen Flow L/min | Oxidation Rate g $Fe^{3+}$/L/h | Consumption g $O_2$/g Fe |
|---|---|---|---|---|
| 14 | 7 | By pulses | 100 | 0.22 |
| 15 | 0 | 0.2 | 28 | 0.65 |
| 16 | 0 | 0.4 | 39 | 0.84 |

Additionally, the iron oxidation rate as a function of molar concentration of hydrochloric acid using ozone or oxygen is presented in Table 3. For the same rate of consumption of gas, the iron oxidation rates increase with increased HCl concentration, meaning that the gas is a more efficient oxidizer at higher HCl concentrations. Additionally, the presence of copper increases the oxidation rate by 33%, indicating that the presence of copper is a catalyst for iron oxidation. The oxidation potential of ozone gas is higher than the oxidation potential of oxygen gas, and as seen in Table 3, the oxidation rate of iron is higher when using ozone gas instead of oxygen gas under the same conditions.

TABLE 3

Effect of HCl concentration and presence of copper

| Test | HCl Molarity | Gas | Cu, g/L | Oxidation Rate, g $Fe^{3+}$/L/h | Consumption g $O_2$/g Fe |
|---|---|---|---|---|---|
| 21 | 0.7 | $O_3$ | 0 | 35 | 3.4 |
| 22 | 2 | $O_3$ | 0 | 47 | 3.4 |
| 23 | 4 | $O_3$ | 0 | 54 | 3.4 |
| 26 | 4 | $O_3$ | 10 | 72 | 3.4 |
| 24 | 4 | $O_2$ | 0 | 30 | 3.4 |
| 27 | 4 | $O_2$ | 10 | 56 | 3.4 |

Reduction of Copper Content in a Molybdenite Concentrate

The effectiveness of leaching copper from a molybdenite concentrate using ferric chloride is tested in several experiments using solutions of ferric chloride. The leaching is performed on a disk filter cake sample containing 3.2% w/w Cu, 1.7% w/w Fe, and 49.2% w/w Mo which is fed to the copper leaching reactors. A ferric chloride solution is added to the leaching reactor. The ferric chloride solution is prepared by oxidizing ferrous chloride to ferric chloride in the presence of oxygen. The molybdenite concentrate is agitated in the ferric chloride solution at atmospheric pressure and at 100° C. No oxygen is injected during these leaching tests. Table 4 shows the experimental conditions and results for several leaching times followed by filtration at 60° C. To assure an excess of $Fe^{(2+)}$ during the leaching process, the concentration of $Fe^{(2+)}$ is about 90 g/L.

TABLE 4

Dissolution of Copper Sulfide Followed by Filtration at 60° C.

| | Time | % | Initial solution g/L | | | Final solution g/L | | | Residue % | | | kg $Fe^{(3+)}$ per kg |
|---|---|---|---|---|---|---|---|---|---|---|---|---|
| Test | min | solids | $Fe^{(3+)}$ | $Fe^{(2+)}$ | Cu | $Fe^{(3+)}$ | $Fe^{(2+)}$ | Cu | Cu | Fe | Mo | concentrate |
| LHV-24 | 15 | 40 | 85.5 | 14.5 | 1.74 | 30 | 55 | 15.7 | 0.21 | 0.59 | 52.6 | 0.082 |
| LHV-25 | 30 | 40 | 85.5 | 14.5 | 1.74 | 34 | 67 | 19 | 0.13 | 0.53 | 52.7 | 0.076 |

TABLE 4-continued

Dissolution of Copper Sulfide Followed by Filtration at 60° C.

| Test | Time min | % solids | Initial solution g/L $Fe^{(3+)}$ | Initial solution g/L $Fe^{(2+)}$ | Initial solution g/L Cu | Final solution g/L $Fe^{(3+)}$ | Final solution g/L $Fe^{(2+)}$ | Final solution g/L Cu | Residue % Cu | Residue % Fe | Residue % Mo | kg $Fe^{(3+)}$ per kg concentrate |
|---|---|---|---|---|---|---|---|---|---|---|---|---|
| LHV-23 | 30 | 20 | 95 | 12 | 0.4 | 71.7 | 32.9 | 8.8 | 0.22 | 0.46 | 53.1 | 0.093 |
| LHV-26 | 45 | 40 | 85.5 | 14.5 | 1.74 | 31.9 | 68.1 | 19.5 | 0.09 | 0.42 | 52.6 | 0.079 |
| LHV-27 | 60 | 40 | 85.5 | 14.5 | 1.74 | 34 | 63 | 18.7 | 0.09 | 0.42 | 53.0 | 0.076 |
| LHV-28 | 90 | 40 | 85.5 | 14.5 | 1.74 | 25.2 | 65.8 | 17.7 | 0.05 | 0.40 | 53.1 | 0.089 |
| LHV-22 | 120 | 20 | 95 | 12 | 0.4 | 66.1 | 37.1 | 9.1 | 0.02 | 0.29 | 53.4 | 0.116 |

The residue left after leaching for 15 minutes has a copper content of 0.2% w/w after filtration, and the copper content continues to decrease to 0.05% w/was the leaching time increases. The mass ratio of consumed ferric chloride to initial concentrate is almost constant at about 0.08 for solid concentrations of 40% w/w. The mass ratio is increased to about 0.09 to about 0.12 for solid concentrations of 20% w/w. The occurrence of a constant mass ratio of consumed ferric chloride to initial concentrate indicates that when the copper sulfide reaction is almost complete (when the concentration of copper is below 0.2% w/w), the consumption of ferric chloride is negligible.

Because the solubility of copper and iron ions decreases as water solvent temperature decreases and the solvent pH increases, the effect of temperature and acidity of the water used to rinse the residue after leaching is evaluated in Table 5. After filtration, the residue is divided into halves, and each half is rinsed with either tap water at 60° C. or with acidic water at 100° C. The higher temperature rinse results in a slightly higher dissolution of copper and iron compounds than at the lower temperature rinse. The filtration and rinse will often be performed at about 60° C. due to the nature of the filtration material.

TABLE 5

The Effect Temperature and Acidity of Rinsing Water in Filtration

| | | Filtration using 0.5 L tap water at 60° C. | | | | | Filtration using 0.5 L tap water at 100° C., pH = 2.0 | | | | |
|---|---|---|---|---|---|---|---|---|---|---|---|
| | Leaching Time | Residue % w/w | | | Rinsed solution g/L | | Residue % w/w | | | Rinsed solution g/L | |
| Test | Min | Cu | Fe | Mo | Cu | Fe | Cu | Fe | Mo | Cu | Fe |
| LHV-24 | 15 | 0.211 | 0.59 | 52.62 | 0.279 | 1.22 | 0.202 | 0.41 | 52.9 | 0.358 | 1.80 |
| LHV-25 | 30 | 0.131 | 0.53 | 52.67 | 0.24 | 0.98 | 0.12 | 0.31 | 52.87 | 0.288 | 1.48 |
| LHV-26 | 45 | 0.091 | 0.42 | 52.63 | 0.175 | 0.62 | 0.086 | 0.30 | 52.92 | 0.219 | 1.06 |
| LHV-27 | 60 | 0.09 | 0.42 | 53.03 | 0.415 | 1.88 | 0.086 | 0.31 | 53.01 | 0.404 | 2.14 |
| LHV-28 | 90 | 0.05 | 0.40 | 53.08 | 0.548 | 2.58 | 0.042 | 0.23 | 53.1 | 0.491 | 2.56 |

Evaluation of the dissolution of copper in a molybdenite concentrate in the presence of a continuous flow of oxygen is tested in a set of experiments as tabulated in Table 6. Hydrochloric acid is added to the dissolution vessel to keep the concentration constant at the molarities given in the Table 6. After 1 hour of leaching, the copper in the final concentrate is below 0.2% only for tests run in the presence of oxygen. For these tests, the final ferric chloride concentration is similar to its initial concentration. When the initial hydrochloric acid concentration is 0.5 M in the presence of oxygen, the final ferric ion concentration is zero and the iron in the molybdenite concentrate increases to 3.05% w/w, indicating that a significant iron precipitation occurs below 0.5 M HCl. In the absence of oxygen, there is no ferric chloride regeneration and, in these tests, the copper concentration in the final concentrate is above 0.2% w/w.

TABLE 6

Effect of Oxygen and HCL Concentration on Copper Dissolution

| | Initial conditions | | | | Disk Filter concentrate | | Final Concentrate | | Final |
|---|---|---|---|---|---|---|---|---|---|
| Test | Temperature ° C. | $Fe^{(3+)}$ g/L | Gas | HCl M | Cu % | Fe % | Cu % | Fe, % | $Fe^{(3+)}$ g/L |
| LHV-16 | 73.4 | 18.7 | No | 2 | 3.77 | 1.84 | 0.41 | 0.33 | 0 |
| LHV-17 | 73.4 | 18.7 | 0.5 L/min 02 | 2 | 3.77 | 1.84 | 0.11 | 0.34 | 11.3 |
| LHV-18 | 73.4 | 18.7 | 0.5 L/min 02 | 2 | 3.77 | 1.84 | 0.09 | 0.34 | 14.6 |
| LHV-19 | 64.4 | 26.8 | 0.5 L/min 02 | 0.5 | 3.77 | 1.84 | 0.50 | 3.05 | 0 |
| LHV-20 | 74.8 | 25.1 | No | 1 to 3 | 0.42 | 0.75 | 0.29 | 0.47 | 0 |
| LHV-21 | 74.8 | 25.1 | No | 1 to 3 | 3.77 | 1.84 | 0.35 | 0.32 | 0 |

Based on the above mentioned experimental results, an embodiment of the process carried out in system 100 shown in FIG. 1 is described for 1 metric ton of a molybdenite concentrate comprising about 3.8% w/w copper, about 1.8% w/w iron, and about 50% w/w molydenum (as in Table 6). Based on Table 4, the amount $Fe^{3+}$ needed will be about 0.1 metric ton, or 0.1 kg of $Fe^{3+}$ per 1 kg of concentrate (from 0.08 to 0.12, Table 4). To keep the percentage of solids at 20% of the total mass, 4 metric tons of water, or about 4000 L, is needed. Based on the values of 0.65 to 3.4 kg $O_2$/1 kg Fe in Tables 2 and 3, the amount of oxygen needed will be 2.5 kg of $O_2$ per 1 kg of Fe, or 250 kg of $O_2$ per metric ton of concentrate. However, in Table 6 the oxygen flow rate is 0.5 L $O_2$ per minute for an hour in a 0.5 L solution. For a 4000 L solution such a flow rate yields 328 Kg $O_2$ per metric ton concentrate over a period of an hour, which would provide an excess amount of $O_2$ to react ferrous chloride to ferric chloride. The amount of HCl required to assist in the iron oxidation is based on 0.33 kg HCl per 1 kg of Fe. With 100 kg Fe present per metric ton of concentrate, the amount of HCl needed is 33 kg per metric ton concentrate introduced into the dissolution vessel over a period of 1 hour.

In an embodiment of the process carried out in the system 200 shown in FIG. 2, the amount of $O_2$ consumed is less at higher pressures than at atmospheric pressures. Additionally, the oxidation rate of Fe is higher at the higher pressures. Therefore, less $O_2$ gas is needed for the process to operate. At about 7 bar gauge, the consumption of $O_2$ is 0.22 kg per kg of Fe (Table 2). This translates to 22 kg $O_2$ per metric ton of concentrate over a period of 1 hour.

Also common for both process 100 and process 200 is that both processes can be performed in a batch operation mode and a continuous operation mode. A batch operation mode is very much like the experiments described above, where the concentrate is leached for a set amount of time, then filtered and the filtrate recycled into a new batch of concentrate. However, in a continuous operation mode, a constant flow of gas and HCl is added to keep the concentration of ferric chloride at a level which is efficient for continuous leaching of the molybdenite concentrate. Leached molybdenite concentrate can be removed as new unleached concentrate is introduced into the dissolution vessel. Additionally, a stream of iron chloride solution from the dissolution vessel can be removed to undergo dedecopperization and the optional iron removal before being recycled back into the dissolution vessel. This way, leaching can continue uninterrupted for an extended period of time.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A batch method for removing copper from a molybdenite concentrate that contains copper sulfides in the absence of chlorine gas, the method comprising the steps of:

a). placing ferrous chloride in an autoclave and converting the ferrous chloride to ferric chloride by reacting the ferrous chloride with oxygen or a combination of oxygen and ozone in the presence of hydrochloric acid at a temperature greater than 100° C. and at a pressure up to 30 bar in order to form a ferric chloride solution;

b). adding the molybdenite concentrate that contains copper sulfides as an impurity to the ferric chloride solution in the autoclave in the presence of an additional amount of hydrochloric acid in order to dissolve copper from the copper sulfides at temperature greater than 100° C. and a pressure up to 30 bar thereby forming a slurry of unreacted molybdenite concentrate and a solution that contains copper ions from the dissolved copper sulfides;

c). separating the molybdenite concentrate from the solution that contains the copper ions by filtration thereby obtaining a molybdenite concentrate having an amount of copper less than about 0.2% w/w and a clear solution that contains the copper due to the dissolution of copper sulfides.

2. The method of claim 1, wherein the hydrochloric acid is added in steps a) and b) in an amount to keep the acidity of the reaction at a concentration between about 1.0 M and about 4.0 M.

3. The method of claim 2, wherein steps a) and b) are carried out at a pressure from 0 to 7 bar.

4. The method of claim 1, wherein during steps a) and b), agitation is provided in the autoclave vessel for between 10 minutes and 120 minutes for each step.

5. The method of claim 1, wherein the solution that contains copper ions has a copper ion concentration above about 1 g/L.

6. A continuous method for removing copper from a molybdenite concentrate that contains copper sulfides in the absence of chlorine gas, the method comprising the steps of:

a). placing ferrous chloride, molybdenite concentrate that contains copper sulfides, hydrochloric acid and an oxidant selected from the group consisting of oxygen or a combination of oxygen and ozone in a container and simultaneously converting ferrous chloride to ferric chloride while dissolving copper from the copper sulfides by reacting the ferrous chloride with the oxygen or the combination of oxygen and ozone in the presence of the hydrochloric acid in order to form ferric chloride which dissolves copper from the copper sulfides thereby forming a slurry of unreacted molybdenite concentrate having an amount of copper less than 0.2% w/w and a solution that contains copper ions from the dissolved copper sulfides, the reaction being carried out at a temperature greater than 100° C. and at a pressure up to 30 atmosphere.

7. The method of claim 6, wherein the process further comprises continuously removing a portion of the slurry from the container and separating the molybdenite concentrate from the solution that contains the copper ions by filtration.

8. The method of claim 6, wherein the hydrochloric acid is added in an amount to keep the acidity of the reaction at a concentration between about 1.0 M and about 4.0 M.

9. The method of claim 1, wherein agitation is provided during the method.

* * * * *